United States Patent [19]

Goodby et al.

[11] Patent Number: 4,613,209

[45] Date of Patent: Sep. 23, 1986

[54] SMECTIC LIQUID CRYSTALS

[75] Inventors: John W. Goodby, Berkeley Heights; Thomas M. Leslie, Scotch Plains, both of N.J.

[73] Assignee: AT&T Bell Laboratories, Murray Hill, N.J.

[21] Appl. No.: 361,361

[22] Filed: Mar. 23, 1982

[51] Int. Cl.[4] ........................ G02F 1/13; C09K 19/06; C09K 19/32; C09K 19/20; C09K 3/34

[52] U.S. Cl. ............................ 350/350 S; 252/299.6; 252/299.62; 252/299.64; 252/299.66; 252/299.68; 252/299.65; 252/299.67

[58] Field of Search ........... 252/299.01, 299.6, 299.62, 252/299.63, 299.64, 299.65, 299.66, 299.67, 299.68; 350/350 S

[56] References Cited

U.S. PATENT DOCUMENTS

| | | | |
|---|---|---|---|
| 3,816,334 | 6/1974 | Yamazaki | 252/299.68 |
| 3,816,336 | 6/1974 | McCaffrey | 252/299.68 X |
| 4,020,002 | 4/1977 | Oh | 252/299.64 |
| 4,082,428 | 4/1978 | Hsu | 252/299.64 |
| 4,083,797 | 4/1978 | Oh | 252/299.66 X |
| 4,099,856 | 7/1978 | Weissflog | 252/299.64 X |
| 4,136,053 | 1/1979 | Steinsträsser | 252/299.65 |
| 4,149,413 | 4/1979 | Gray | 252/299.67 X |
| 4,162,988 | 7/1979 | Maze | 252/299.65 |
| 4,195,916 | 4/1980 | Coates | 252/299.67 X |
| 4,216,109 | 8/1980 | Mizukuchi | 252/299.65 |
| 4,222,887 | 9/1980 | Matsufuji | 252/299.64 X |
| 4,405,209 | 9/1983 | Funada et al. | 252/299.2 X |
| 4,576,732 | 2/1986 | Isogai et al. | 252/299.65 |

FOREIGN PATENT DOCUMENTS

| | | | |
|---|---|---|---|
| 115693 | 6/1983 | European Pat. Off. . | |
| 136845 | 1/1984 | European Pat. Off. . | |
| 110299 | 6/1984 | European Pat. Off. . | |
| 2814737 | 10/1978 | Fed. Rep. of Germany . | |
| 58-29877 | 8/1981 | Japan . | |
| 58-55447 | 1/1983 | Japan . | |
| 28487 | 7/1983 | Japan . | |
| 899536 | 1/1982 | U.S.S.R. | 252/299.64 |

OTHER PUBLICATIONS

Loseva et al., Fiz. Tverd. Tela (Leningrad), 1980, 22(3), 938–41, "Stereo Effects on the Ferroelectricity of Chiral Smectic LC".

Bubel et al., "Synthesis and Mesomorphic Properties of Some Esters . . . ", Vest Beloruss Gos Univ., Ser. II, pp. 2–8, 1979.

Chemical Abstracts Service, CA 97 (26), 228063m, abstract of Soviet Pat. No. 899536, (1982).

Demus et al., Flüssige Kristalle in Tabellen, 1975, pp. 152–219.

Clark and Lagerwall, "Submicrosecond Bistable Electro-Optic . . . ", Appl. Phys. Lett., 36(11), 1980, pp. 899–891.

*Primary Examiner*—Teddy S. Gron
*Assistant Examiner*—Catherine S. Kilby
*Attorney, Agent, or Firm*—Bruce S. Schneider

[57] ABSTRACT

The use of a certain class of liquid crystal materials that exhibit a smectic C phase allows the production of a bistable liquid crystal display element. Such bistable display elements promote the use of matrix addressing for liquid crystal based elements in a display.

14 Claims, 1 Drawing Figure

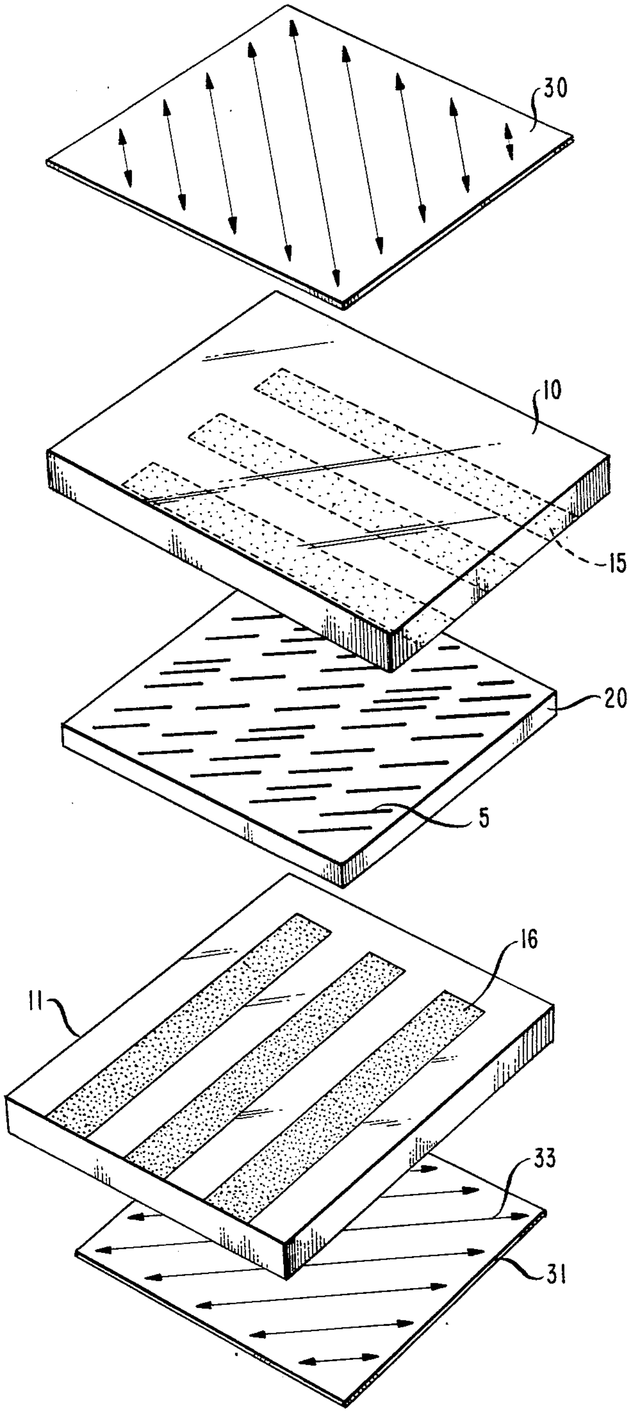
30
10
15
20
5
16
11
33
31

SMECTIC LIQUID CRYSTALS

BACKGROUND OF THE INVENTION

1. Field of the Invention

This invention relates to optical devices and in particular to display devices.

2. Art Background

Liquid crystal materials are presently employed in a wide variety of display devices. Various expedients are utilized to produce a desired optical change upon application of an electric field. The applied field induces a change in the liquid crystal. The particular change induced depends on the phase of the liquid crystal being employed. The phsyical configuration of the device, e.g., the placement of polarizers, is designed to yield an observable optical change in conjunction with the specific spatial change induced in the molecules of the liquid crystal bulk.

Liquid crystals exist in a number of phases and the ambient temperature strongly influences the phase in which a liquid crystal is found. (See G. W. Gray and P. A. Winsor, *Liquid Crystals and Plastic Crystals,* Vols. 1 and 2, Halsted Press (1974); G. R. Luckhurst and G. W. Gray, *The Molecular Physics of Liquid Crystals*, Chapters 1 and 12, Academic Press (1979); and D. Demus et al, *Flussige Kristalle in Tabellen*, VEB Verlag, Leipzig, (1974) for a description of these phases, specific liquid crystals which exhibit these phases, and typical ranges of temperatures for transitions between these phases.) Thus, since a device is designed for a particular phase of the liquid crystal being utilized, the device is useful only in the temperature range where the liquid crystal exists in the desired phase.

In the most commonly employed device configuration, i.e., a twist cell, a liquid crystal in its nematic phase is utilized. (See G. W. Gray, *Advances in Liquid Crystals,* BDH Publications (1979) for a description of twist cells.) Although devices based on nematic liquid crystals have achieved wide spread use, they typically do not have memory, i.e., upon application of an electric field the liquid crystal changes state and in the particular device configuration being employed produces an optical change. However, upon removal of this field, it reverts to its original physical and optical state.

Memory is a desirable property for devices employed in large scale displays which are matrix addressed. In such displays the matrix is typically formed from an array of liquid crystal device elements. Electrodes (x and y electrodes) are employed to apply an electric field to a given matrix element. The total field applied to an element is the resultant field produced by the voltage applied through the x and through the y electrode. The x and y electrodes are also arranged to form a matrix with a liquid crystal display element at each intersection of a x and a y electrode. By applying a suitable voltage to the appropriate x and y electrode, the optical state of the matrix element at the intersection of these electrodes is changed. Thus, by using n number of x electrodes and m number of y electrodes, mxn elements are controlled. If the matrix elements are bistable—if they require an electric field to change from a first state to a second and the application of another field to change back—the voltages applied to the x and the y electrodes need not be sustained to maintain the optical change which they induce. As a result of this attribute, a considerable simplification in the electronics necessary to control a display array is achieved.

A variety of methods have been proposed to produce a bistable device—a device that upon application of a field assumes a second state which persists after removal or diminution of the field until a second field is applied. One of these methods depends upon the use of liquid crystals having a smectic C, I, or F state. (See N. A. Clark and S. T. Lagerwall, *Applied Physics Letters,* 36(11), 899 (1980).) (The smectic I or F liquid crystals are not as fluid, and are not preferred since they switch relatively slowly.) Basically, this device utilizes the two spatial orientations of the polarizability vector in a ferroelectric, smectic C phase liquid crystal. These two orientations typically are stable and are separated by a potential energy barrier. Once one state is induced, it requires energy to convert the liquid crystal from one spatial orientation state within the smectic C phase to the other. Thus, a bistability is inherent in the material. To employ this bistability, a device is fabricated by contacting the liquid crystal material with two electrodes in a manner which produces a succession of smectic C phase layers, 5, as shown in the FIGURE. (The liquid crystal material is initially brought into this layered structure by placing a liquid crystal mass in the smectic A phase between the two electrode plates, bringing the plates close together (for example, within 10 μm or less) and sliding the plates relative to each other.) A change of state in a given region of the liquid crystal material is produced by applying an appropriate field to the electrodes bounding this region. (The field need not be maintained.) A second field is applied in turn, to return the liquid crystal material to its initial state. An optical change accompanying the change in state is produced by, for example, orienting crossed polarizers above and below the electrode-liquid crystal-electrode sandwich, with the direction of one polarizer aligned with the direction of the long axis of the liquid crystal molecules in either one of the two spatial orientations.

The sole liquid crystal materials suggested for use in a smectic C bistable device are decyloxybenzylidene p'-amino-2-methylbutylcinnamate hexyloxybenzylidene p'-amino-2-chloropropylcinnamate. Although these materials are useful, they have a variety of shortcomings. The most significant of these problems is that these materials exist in the smectic C phase only in a very narrow temperature range and that the materials are not particularly stable. Thus, bistable devices depending on these liquid crystal materials are somewhat limited shelf life and are not useful in applications which require device operation in a wide range of temperature conditions. Additionally, these liquid crystal materials have a smectic C phase only well above room temperature. Obviously, a device employing these materials would not be suitable for room temperature applications and thus, is of diminished utility for many applications.

SUMMARY OF THE INVENTION

The use of a particular class of stable liquid crystal materials having a smectic C phase allows the fabrication of a bistable device operable through a relatively wide temperature range which, with an appropriate choice of materials, includes room temperature. These liquid crystal materials are those represented by the general formula

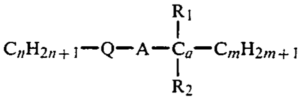

where Q is a core entity that comprises a moiety comprehended by the following four classes including (I)

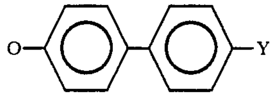

where Y is 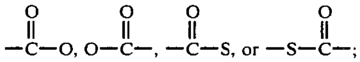

(II)

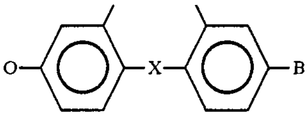

where X is 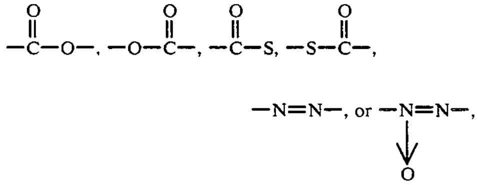

where B is 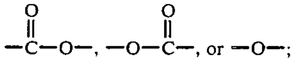

(III)

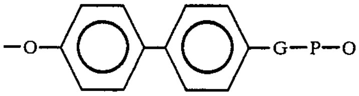

where G is 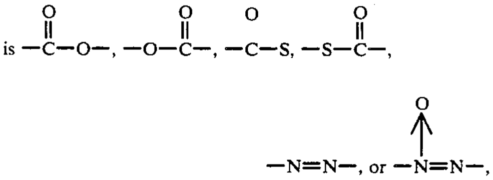

where P is 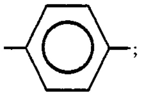

(IV)

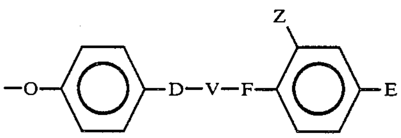

where V is 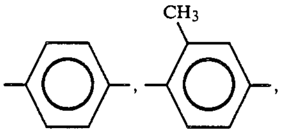

-continued

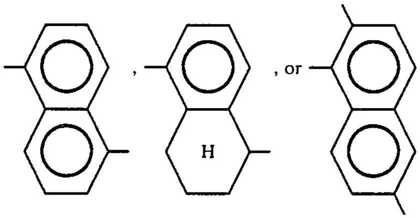

where D is 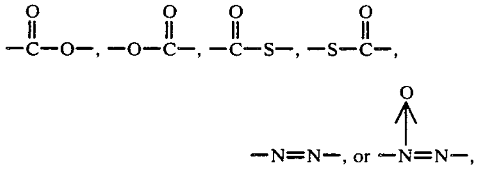

where E is 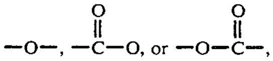

where F is 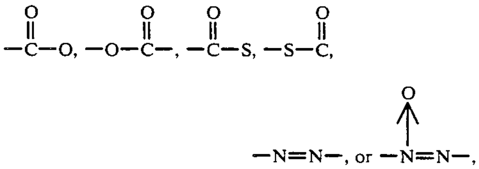

where if V is 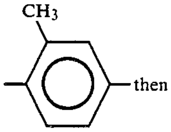 then Z is H and where if V is 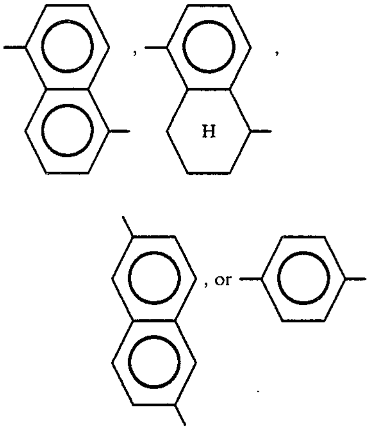

then Z is H, or $CH_3$, where A provides a separation between Q and $C_a$ which is at least 2.0 Å, and where $C_a$ is an asymmetric carbon atom whose asymmetry is produced by an appropriate choice of $R_1$ and $R_2$. (Here and throughout the disclosure, the letters Q, A, R, Y, X, Z, B, G, P, D, V, F and E represent groups of atoms and the letters C, O, S, N, and H stand solely for carbon, oxygen, sulfur, nitrogen, and hydrogen atoms respectively.)

BRIEF DESCRIPTION OF THE DRAWING

The FIGURE, an exploded view, is illustrative of embodiments of the invention.

DETAILED DESCRIPTION

The inventive liquid crystal devices based on the smectic C phase depend on a particular composition for the liquid crystal material employed. This liquid crystal material is represented by the formula

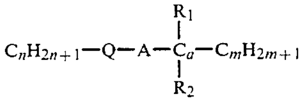

(1)

where Q is a core entity that comprises a moiety comprehended by the following four classes including (I)

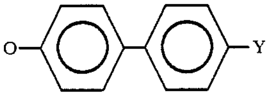

where Y is 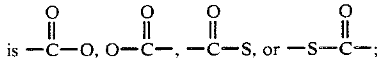;

(II)

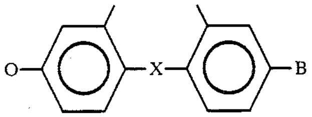

where X is 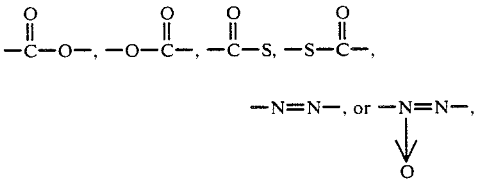

where B is 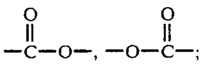;

(III)

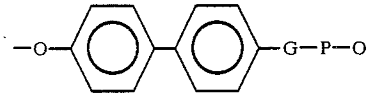

where G is 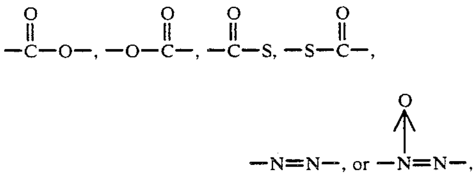

where P is 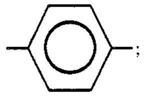;

(IV)

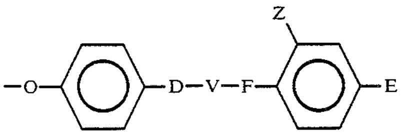

where V is 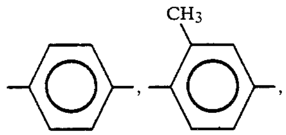,

-continued

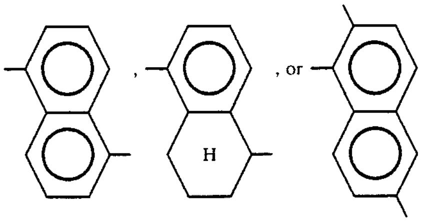

where D is 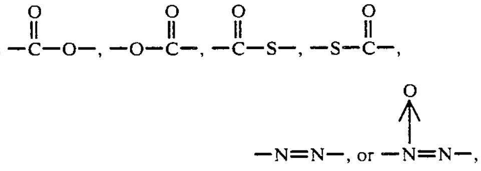

where E is 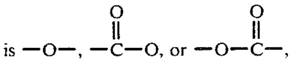

where F is 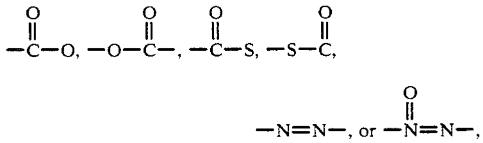

where if V is 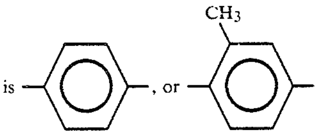 then Z is H and where if V is 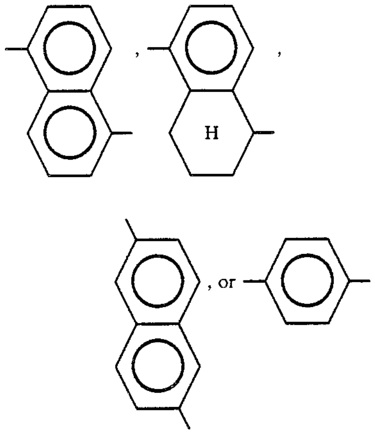

then Z is H, or $CH_3$, where A in formula (1) is also chosen to provide a separation between Q and $C_a$ of at least 2.0 Å, and where $C_a$ is an asymmetric carbon atom.

Typical core entities include

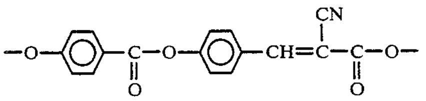

(2)

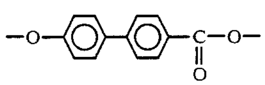

(3)

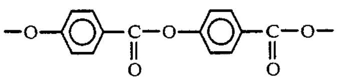

(4)

-continued

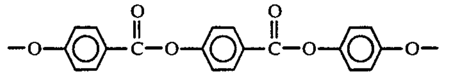
(5)

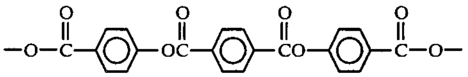
(6)

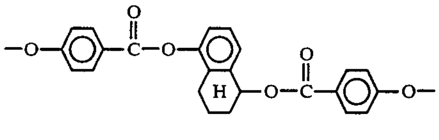
(10)

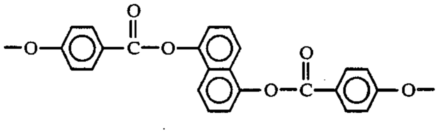
(11)

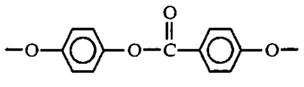
(12)

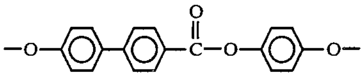
(13)

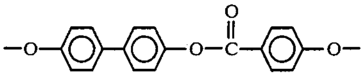
(14)

These examples fall within the requirements of moieties described for Q. Thus, the Q of a material such as

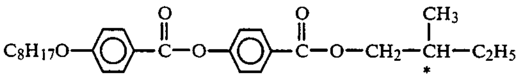
(15)

satisfies the stated criteria.

Generally, a spacer group (A group) such as a methylene group or a chain of methylene groups is employed. The A group should have a length as measured along the long axis of the molecule, in the range of approximately 2 to 20 Å. A methylene group has a radius of approximately 2 Å. Thus, 1 methylene group up to a chain of 10 methylene groups yields the desired separation. It is possible, for example, to employ spacer groups such as $CH_2$, $C_2H_4$, $C_3H_6$, and $C_4H_8$. Although larger spacer groups, groups having a length greater than $C_{12}H_{24}$, are not precluded, generally their use leads to materials having a smectic A but no smectic C phase.

An appropriate $C_a$ is a carbon atom that is bound to four other entities which are all different. Thus, for example, in the compound

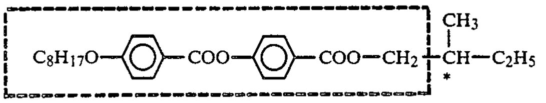
(16)

the asymmetric carbon, indicated by a star, is bound to a hydrogen, an ethyl group, a methyl group and to the group enclosed within the dotted rectangle. The $R_1$ and $R_2$ group in equation (1) employed to produce the desired asymmetry should be sufficiently small that they have a van der Waals radius of less than 3 Å, preferably less than 2 Å. Thus, functional groups such as lower alkyls, e.g., methyl and ethyl, chloro, trifluoromethyl, and hydrogen are appropriate.

The number of carbon atoms in the $C_nH_{2n+1}$ and $C_mH_{2m+1}$ groups influences the temperature at which the liquid crystal material is in the smectic C phase. Typically, to achieve onset of the smectic C phase at temperatures below 70 degrees C., lower alkyl moieties are employed. For example, n typically should be in the range 7 to 16, and m should be in the range 2 to 10. (It should be noted that $C_nH_{2n+1}$ and $C_mH_{2m+1}$ are preferably aliphatic. Typically, an excessively bulky group or a group that produces excessive internal strain is not desirable since such situations result in loss of the smectic C phase or instability. However, alicyclic moieties are not precluded provided they do not introduce such strain or bulkiness.)

Not all the previously described liquid crystals have a smectic C phase at room temperature. However, it is possible to produce smectic C materials with desirable properties from a combination of materials within the given classes. Additionally, for some materials in the above-described class, the melting point of the material is higher than the temperature at which the smectic C phase would be expected to form. (See J. W. Goodby and G. W. Gray, *Journal de Physique*, 37, 17 (1976) for a description of how to determine at what temperature the smectic C phase would be expected to form in materials which melt and recrystallize at a higher temperature than the smectic C formation temperature.) Again, combinations of materials within the class are advantageously employed so that such materials are useful. For example, the material

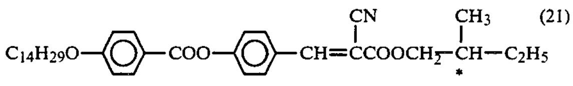
(21)

recrystallizes at 74 degrees C. before it forms a smectic C phase but when mixed with

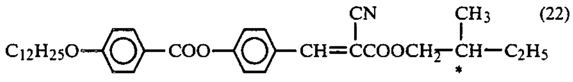
(22)

in a 65 to 35 wt % mixture the combination has a smectic C phase in the temperature range 70 to 59 degrees C. on cooling.

The liquid crystal materials employed in the subject bistable devices are synthesized by conventional techniques through individual conventional reaction steps. For example, liquid crystal materials having a core entity such as shown in formula 12 is produced by reacting an acid of the formula

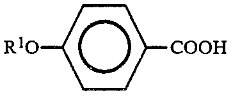
(23)

with an alcohol of the formula

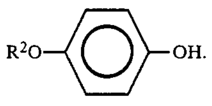
(24)

The acid is produced by reacting p-hydroxybenzoic acid with $R^1Br$ in the presence of sodium hydroxide and ethanol. The alcohol in formula (24) is similarly formed by reacting dihydroquinone with $R^2Br$ in the presence of potassium hydroxide in a 1 to 1 solution of dioxane and water. The alcohol (24) and the acid chloride of the acid (23), respectively, are then reacted in the presence of pyridine to cause esterification and result in the desired liquid cyrstal material. (The acid chloride is produced by contacting the acid with an excess of thionyl chloride.)

Similarly, the compounds having cores shown in formulae 2, 4, 5, 7 and 9 are produced by reacting commercially available compounds such as (25)

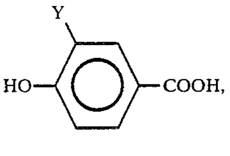

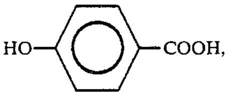

or

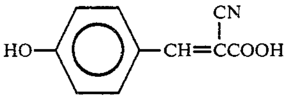

and (26)

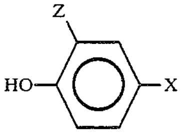

or $HO-R''$ in the presence of sulfuric acid, boric acid and toluene to form (27)

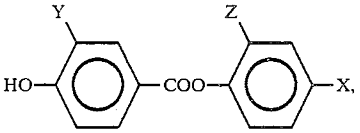

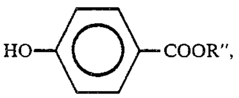

or

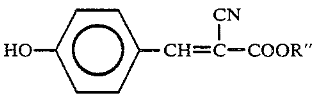

where X is, for example,

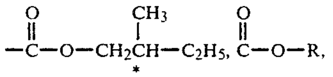

or OR and where if Y is H, $CH_3$ then Z is H and if Z is $CH_3$ then Y is H. This product is then, in turn, reacted in a solution using a solvent such as pyridine and toluene with an acid chloride of the formula (28)

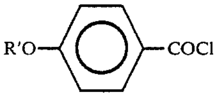

to yield compounds of the formula (29)

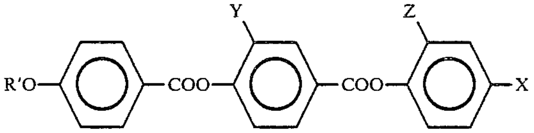

and

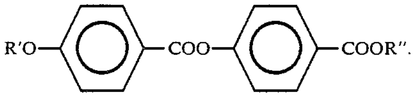

Similarly, dihydroquinone is reacted with an acid chloride of the formula (30)

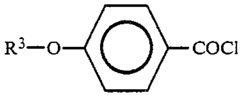

which are made as previously described to yield liquid crystals of the formula (31)

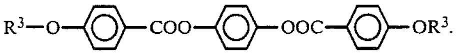

Compounds having a core of the form shown in formulae 3, 13 and 14 are produced by reacting commercially available compounds of the formula (32)

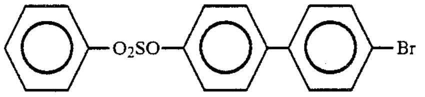

with $R^4Br$ in a solution of potassium hydroxide in a 1 to 1 solvent of dioxane and water to yield a compound of the formula (33)

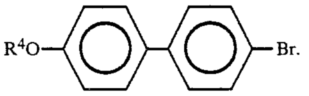

This product is then contacted with CuCN in the presence of N-methyl-2-pyrrolidinone to yield a compound of the formula (34)

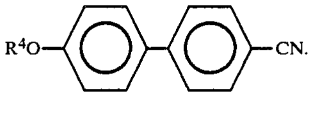

(Materials represented by this formula are also generally commercially available.) These compounds, those of formula (34), are then subjected to a 20 percent solution of potassium hydroxide in a mixture of methanol and 2-ethoxyethanol with approximately an additional 10% by volume of water to produce compounds of the formula (35)

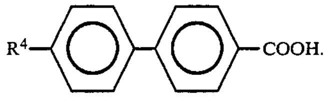

These compounds are then esterified with appropriate alcohols, as previously described, by conventional techniques to yield the desired liquid crystal including those having cores such as shown in formulae 3, 13 and 14.

Compounds having cores of the formulae 10 to 11 are produced by esterifying with an appropriate acid chloride such as those compounds represented by the formula (28) with (36)

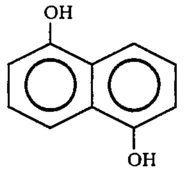

and (37)

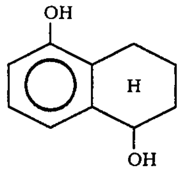

respectively.

To form cores having COS linkages, commercially available materials such as those represented by the formula (38)

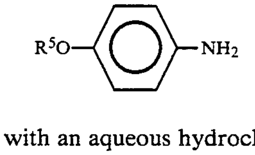

are treated with an aqueous hydrochloric acid solution containing $NaNO_2$. The reaction product is then contacted with NaSH to form compounds of the formula (39)

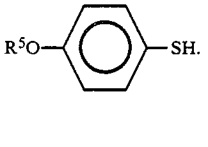

This product is then, in turn, reacted with a desired acid chloride (produced as previously described) to form the compounds of formula (40)

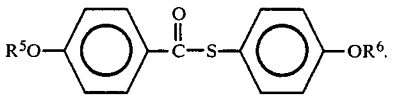

Compounds of the formula (41)

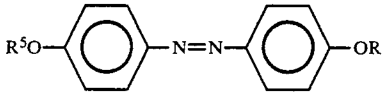

are similarly produced by first reacting compounds of formula (38) with an aqueous hydrochloric acid containing $NaNO_2$. The reaction product is then contacted with an alkoxybenzene

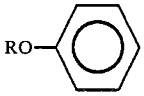

to form the asymmetric reaction product (41), or with

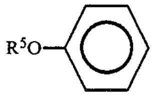

to form the symmetric compound of the formula (42)

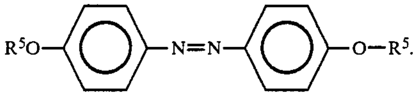

Compounds of the formula (43)

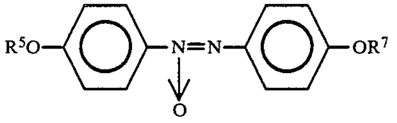

are produced by reacting either compounds of formula (42) or (41) with a peroxide. (As used in the previous discussion of suitable syntheses, the letters R with or without superscripts, generally represent the moieties as shown in formula (1) which are attached to the core.)

To fabricate the desired display device, the previously described liquid crystals or combinations of these liquid crystals are employed. In one embodiment, confining surfaces, e.g., glass plates, 10 and 11, having electrodes, 15 and 16, are used to confine the liquid crystal, 20. The electrodes are fabricated on the confining surfaces by conventional techniques. For example, photolithography is employed to define the areas on the confining surfaces where electrodes are to be formed. The electrodes, e.g., indium oxide electrodes, are then deposited by conventional techniques such as sputter deposition. To obtain a layered smectic C liquid crystal body, it is generally desirable to transform material from the smectic A into the layered smectic C state. This transformation is advantageously performed by first confining the liquid crystal composition between the confining structures and adjusting the ambient temperature so that the composition is in the smectic A phase. The confining structures are brought together so that they are less than 10 μm, preferably less than 7 μm apart. (Larger distances generally lead to unacceptable spatial configurations.) The confining structures are translated relative to each other. The translation causes the liquid crystal composition to convert into an aligned smectic A structure. The ambient temperature is then reduced to produce an aligned smectic C phase.

By applying a suitable voltage to the electrodes, 15 and 16, the spatial orientation of the liquid crystal is changed in the region of the liquid crystal bound by the electrodes. Generally, one state of the liquid crystal moiety is produced utilizing a potential difference in the range of 0 to 20 volts and the second state is produced by utilizing a potential difference in the same range but by changing the electrode held at the lower potential during the initial spatial change to the higher potential. The appropriate voltages for a particular liquid crystal or combination of liquid crystals is easily determined using a control sample.

The change in spatial orientation, and thus optical state, is observed in one embodiment by providing a means such as crossed polarizers, 30 and 31. The crossed polarizers are oriented so that one of the pair of polarizers has its polarization plane shown by 33, within 10 degrees of the long optic axis of the molecules in the aligned liquid crystal. Angles of greater than 10 degrees C., although not precluded, generally lead to unacceptable device contrasts. If the desired layered smectic C structure is going to be produced from a smectic A phase, the liquid crystal composition employed should have a smectic A phase. However, as previously discussed, combinations of liquid crystal materials are useful to form the liquid crystal composition. All the materials forming the composition need not have a smectic A phase provided the composite itself does have this phase.

As previously described, exemplary liquid crystal materials within the class of materials used in the inventive devices are generally synthesized by the reaction of two components—often the reaction of an appropriate acid with an appropriate phenol. The following examples demonstrate such syntheses by first describing the production of suitable alcohols, then describing the production of suitable acids, and then describing the esterification between these alcohols and acids to form the desired liquid crystals.

EXAMPLE 1

Optically active alkylbromides are used in the following examples in making either the acids or alcohols ultimately employed in the esterification to produce liquid crystals. The following procedure describes preparation of these alkylbromides. The bromide corresponding to 2-methylbutanol was produced as described by G. W. Gray and D. G. McDonnell in *Molecular Crystals Liquid Crystals* 37, page 179 (1976). Homologues of this optically active bromide were then produced by a series of reactions. First, the 2-methylbutylbromide was converted into a Grignard reagent by combining approximately 0.1 moles of dry magnesium with approximately 30 ml of dry ether. The magnesium-ether mixture was stirred and approximately 0.02 molar equivalents of the 2-methylbutylbromide was added with stirring. One crystal of iodine was then also added. A solution of 0.08 moles of the bromide in 60 ml of ether was made. This solution was added drop-wise to the stirred mixture over a period of approximately 1 hour. In this manner, the Grignard reagent was produced.

To produce various optically active bromides this Grignard reagent was then reacted in two different ways. In the first procedure a slurry of 2 molar equivalents of paraformaldehyde in tetrahydrofuran was added drop-wise with extreme caution over a period of 1 hour to the Grignard reagent mixture. (Caution is required since rapid addition will cause an explosion.) The mixture was then refluxed and stirred for approximately 3 hours. The excess magnesium and paraformaldehyde was removed by filtering with a Buchner funnel. The filtrate was then evaporated to dryness on a rotary evaporator. Approximately 100 ml of a 25 volume percent solution of concentrated hydrochloric acid in water was added to the residue. The mixture was extracted 3 times with 50 ml aliquots of ether. The ether fractions were collected, combined and dried over anhydrous magnesium sulfate. The resulting mixture was filtered, and the ether was removed by distillation. The resulting final product—3-methylpentanol—was purified by distillation.

In a second use of the Grignard reagent, approximately 0.1 moles of ethylene oxide was added to the Grignard reagent as a gas through a needle valve that extended below the surface of the Grignard reagent mixture. The mixture was stirred and refluxed for approximately 3 hours. The resulting mixture was poured into 200 ml of a 25 percent by volume solution of concentrated hydrochloric acid in water. The ether layer was separated. The remaining aqueous portion was extracted with three 50 ml aliquots of ether. The combined ethereal extracts were dried over anhydrous magnesium sulfate and the desiccant was removed by filtration. The ether was removed by distillation and the remaining product was purified by a further distillation. This procedure resulted in the production of 4-methylhexanol.

The resulting 4-methylhexanol and 3-methylhexanol were brominated as described in A. I. Vogel, *Textbook of Practical Organic Chemistry*, Third Edition, page 281. Compounds in the homologous series are made from these compounds by again forming a Grignard reagent and repeating the described processes.

EXAMPLE 2

Synthesis of Appropriate Alcohols

Potassium hydroxide (5.7 g) was dissolved in 30 ml of distilled water. To this solution was added 11 g of hydroquinone. The mixture was heated under reflux for 30 minutes. Approximately 15.1 g of 1-bromopentane in 20 ml of dioxane was added to the refluxing mixture. (The dioxane is employed to ensure that the 1-bromopentane is miscible with the remainder of the mixture.) Also by employing these reaction conditions, it ensures that only one OH group of the hydroquinone reacts to form the pentylether.)

Stirring of the mixture was initiated and the reflux was continued for 18 hours. The reaction mixture was then transferred to a rotary evaporator and the dioxane in the mixture was removed by evaporation under reduced pressure. The mixture was removed from the rotary evaporator and 50 ml of distilled water was added. A sufficient quantity of hydrochloric acid was added to the mixture to adjust its pH to a value of five. (The pH was adjusted to ensure that any unreacted phenoxide ion was protonated.) The mixture was then extracted with 3 aliquots of 50 ml of dichloromethane. The resulting combined aliquots of dichloromethane solution were dried over anhydrous magnesium sulfate. The solution was filtered through a Buchner funnel and the filtered solution was then evaporated to dryness under reduced pressure.

The resulting residue was purified on a chromatographic column. To effect this chromatography, the residue was dissolved in a minimal amount, approximately 10 ml, of dichloromethane. A column having dimensions of approximately 30×5 cm was filled with 60 to 200 mesh silica gel. The dichloromethane solution was then deposited on the top of and allowed to traverse the column using dichloromethane as the eluant. The second band exiting from the column as determined by thin layer chromatography (TLC) was collected. This band was the monosubstituted product as opposed to the first band which contained the disubstituted product. The collected fraction in the second band was then evaporated to dryness on a rotary evaporator under vacuum to yield the desired product. Purification was accomplished by recrystallization from normal hexane. The resulting purified product was

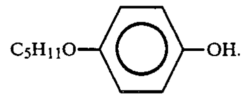

To produce corresponding alkoxyphenols with groups other than pentyl groups, the same method was performed except an appropriate alkylbromide is used instead of pentylbromide. For example, the same procedure was followed using a 1 to 1 mole ratio of alkylbromide to hydroquinone where the alkylbromide was hexylbromide, heptylbromide, octylbromide, nonylbromide, decylbromide, or 2-methylbutylbromide.

EXAMPLE 3

The procedure of Example 1 was followed except the initial mixture was 5.7 g of potassium hydroxide, 30 ml of water, 18.6 g of 4,4'-dihydroxybiphenyl and 2 ml of N,N-dimethylformamide. Additionally, this initial mixture was refluxed for 2 hours rather than 30 minutes. Instead of adding pentylbromide in a 1 to 1 mole ratio with hydroquinone, octylbromide (approximately 19.3 g) was added in a 1 to 1 mole ratio to the 4,4-dihydroxybiphenyl. This resulted in a product represented by the formula

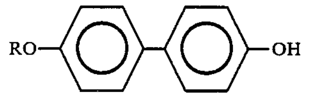

where R was $C_8H_{17}$. Corresponding compounds were prepared by following the procedure of this Example except using as the alkylbromide either hexylbromide, heptylbromide, nonylbromide, decylbromide, dodecylbromide, or 2-methylbutylbromide.

EXAMPLE 4

Approximately 0.05 moles of 4-hydroxybenzoic acid was dissolved in approximately 50 ml of toluene. To this mixture was added an excess (0.1 moles) of S(-)2-methylbutanol. To this mixture was added two drops of concentrated sulfuric acid and a catalytic amount (approximately 0.001 moles) of boric acid. The mixtrue was placed in a reflux apparatus that was fitted with a Dean-Stark trap. The mixture was stirred under reflux for approximately 48 hours. (The Dean-Stark trap was employed to remove the water from the reaction as it was formed.) The reflux was terminated, the mixture was allowed to cool, and the solvent was removed on a rotary evaporator to leave a solid residue. The chromatographic and recrystallization procedure described in Example 1 was then performed on this residue. (Again the second band exiting from the chromatographic column was the desired product.) The resulting product is represented by the formula

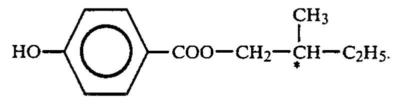

The same procedure was followed except instead of using 4-hydroxybenzoic acid, α-cyano-4-hydroxycinnamic acid or was employed to yield,

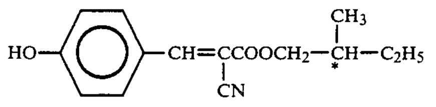

Alternatively, instead of using 2-methylbutanol, 4-n-hexyloxyphenol was employed to yield

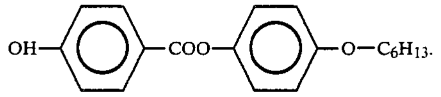

EXAMPLE 5

Preparation of the Acids

Approximately 11 g of potassium hydroxide was added to 20 ml of distilled water. To this mixture was added approximately 160 ml of ethanol. Approximately 14 g of hydroxybenzoic acid was slowly added to the water-ethanol mixture resulting in a clear solution. (This piecemeal addition was necessary to reduce the amount of heating produced by the resulting exothermic reaction.) To the clear solution was added approximately 23.2 g of octylbromide. The mixture was stirred and refluxed for approximately 16 hours. To the refluxing mixture was added approximately 10 ml of a 10 weight percent aqueous solution of potassium hydroxide. The reflux was continued for an additional 2 hours. (The potassium hydroxide was added to ensure that side reactions producing the phenolester rather than the alkoxy acid did not occur.)

To precipitate the product an excess of distilled water (approximately 500 ml) over the amount of ethanol present in the reacted mixture was added. To protonate the reaction product the pH of the mixture was adjusted with concentrated hydrochloric acid to a pH of 5. The resulting mixture was allowed to stand for approximately a half hour to allow the precipitate to coagulate. The mixture was then filtered using a Buchner funnel. The collected solid product represented by the formula

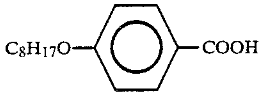

was recrystallized from methanol.

The same procedure was followed except different alkyl bromides were substituted for the octylbromide to produce corresponding products with different ether substituents. These corresponding products were produced by utilizing either pentylbromide, hexylbromide, heptylbromide, nonylbromide, decylbromide, dodecylbromide, tetradecylbromide, hexadecylbromide, 2-methylbutylbromide, 3-methylpentylbromide, or 4-methylhexylbromide in a 1.2 to 1 molar ratio of the desired bromide to the hydroxybenzoic acid.

EXAMPLE 6

Approximately 10 g of potassium hydroxide was added to about 10 ml of distilled water. To this mixture approximately 100 ml of methanol was very slowly added to prevent any backsplashing or boiling. To this solution was added approximately 0.016 moles of 4'-n-octyloxy-4-cyanobiphenyl. The solution was then heated under reflux for approximately 2 hours. To the reflux solution was added 150 ml of 2-ethoxyethanol and the reflux was continued for approximately 14 days. (The extended reaction period was required to ensure that all the intermediate amide is converted into the desired product.) The resulting product was

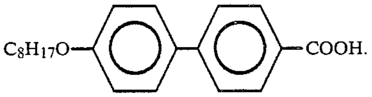

The reaction mixture was poured into an excess of distilled water over the amount of methanol present. (Approximately 500 ml of water was employed.) The pH was adjusted to a value of 5 by the addition of an appropriate amount of concentrated hydrochloric acid. The resulting suspension was allowed to stand for approximately 3 hours to allow the relatively slow protonation of the acid salt. The free acid precipitate was then filtered in a Buchner funnel. The resulting solid product was recrystallized fom glacial acetic acid.

Corresponding products with different alkylether moieties were produced by following the same procedure except instead of using 4'-n-octyloxy-4-cyanobiphenyl, the corresponding pentyl, hexyl, heptyl, nonyl, and decyl compounds were employed.

EXAMPLE 7

Production of Liquid Crystals Through Esterification of the Alcohols of Examples 1-3 to Form 1. Monoesters such as those of the formulae

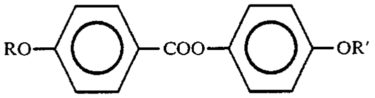

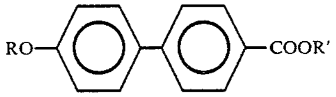

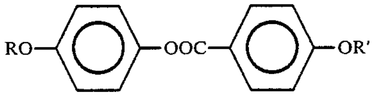

As a first step in the esterification an acid chloride is produced. This acid chloride is synthesized by dissolving 0.005 moles of the desired acid in a molar excess of thionyl chloride (approximately 20 ml). The solution was refluxed for approximately 2 hours. The refluxed solution was then transferred to a rotary evaporator to remove the remaining thionyl chloride. A solution containing approximately 0.006 moles of the desired alcohol is 15 ml of pyridine, 15 ml of toluene and 2 ml of N,N'-dimethylformamide was prepared. This solution was then added directly to the acid chloride. The resulting mixture was refluxed for approximately 8 hours to produce the liquid crystal.

After refluxing, the mixture was transferred to a rotary evaporator and evaporation was continued until further reduction in volume was not effected. A chromatographic purification as described in Example 1 was performed except the column had a dimension of 30×3 cm and the eluant employed was dichloromethane/hexane solution in a 1 to 1 by volume ratio. The desired product, depending on the acid chloride and the alcohol employed, exits in a particular band during chromatography. Each band is collected and evaporated to dryness. A fraction of the residue from each band was subjected to thin layer chromatography and infra-red spectroscopy to determine which band contained the desired product. The product is recrystallized in petrol ether (40°-60° degrees C.). Generally, to facilitate the recrystallization, the solution was cooled with dry ice. The following table lists the liquid crystals produced and their phase sequences.

TABLE 1

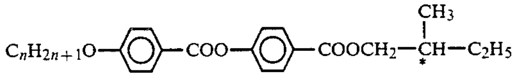

| n | I-$S_A$ | $S_A$-$S_C$* | MP |
|---|---|---|---|
| 5 | 48 | — | 63 |
| 6 | 55 | — | 39 |
| 7 | 53 | 19 | 35 |
| 8 | 58 | 32 | 33 |
| 9 | 57 | 32 | 56 |
| 10 | 59.5 | 35 | 52 |
| 12 | 60 | 35.5 | 55 |
| 14 | 60 | 35 | 40 |
| 16 | 60.2 | 34.5 | 49 |

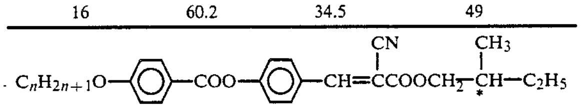

| n | Ch-I | $S_A$-Ch | $S_A$-I | $S_A$-$S_C$* | MP |
|---|---|---|---|---|---|
| 5 | 71 | — | — | — | 92.7 |

TABLE 1-continued

| | | | | | |
|---|---|---|---|---|---|
| 6 | 82 | 67 | — | — | 82.2 |
| 7 | 82.6 | 74.1 | — | 58.0 | 74.9 |
| 8 | 85.6 | 82.5 | — | 60.6 | 86.0 |
| 9 | 86.6 | 85.5 | — | — | 86.7 |
| 10 | — | — | 87.7 | — | 86.1 |
| 12 | — | — | 89.0 | 71.7 | 81.4 |
| 14 | — | — | 91.0 | — | 84.0 |
| 16 | — | — | 92.3 | — | 87.5 |

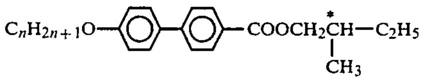

| n | I-$S_A$ | $S_A$-$S_C$* | MP |
|---|---|---|---|
| 5 | 64 | 43.9 | 42.7 |
| 6 | 66 | — | 48 |
| 7 | 64.7 | — | 57.5 |
| 8 | 65.9 | 44 | 49.2 |
| 10 | 66.2 | 41.2 | 48.2 |

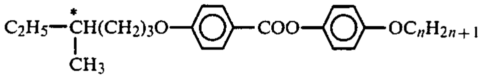

| n | Ch-I | Ch-$S_C$* | MP |
|---|---|---|---|
| 6 | 63.8 | 43.4 | 44.6 |
| 7 | 63.7 | 46.4 | 30 |
| 8 | 62.2 | 47.2 | 35 |
| 9 | 57.2 | 45.4 | 32.2 |
| 10 | 62.2 | 47.7 | 33 |

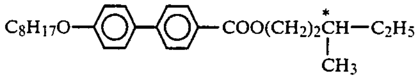

| I → | $S_A$ → | $S_C$* | MP |
|---|---|---|---|
| 72 | 58 | | 59 |

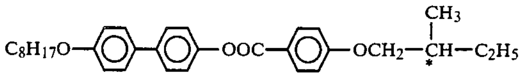

TABLE 1-continued

| I → | Ch → | $S_C$* | MP |
|---|---|---|---|
| 146.3 | 121.5 | | 103.8 |

All temperatures in degree C.
I = Isotropic
$S_A$ = Smectic A
$S_C$ = Smectic C
MP = Melting Point
Ch = Cholesteric
cryst = Crystalline (It should be noted that in some cases the product corresponds to the use of 2-methylbutyl alcohol as the alcohol in the esterification process. This alcohol was not synthesized but was merely purchased commercially.)

2. Diesters such as those of the formulae

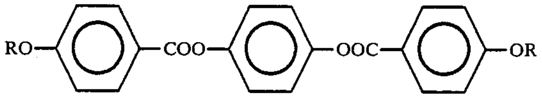

or

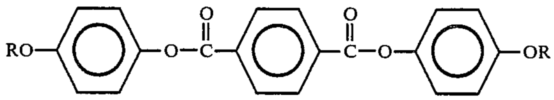

The procedure described above for the esterification was followed except 2 mole equivalents of the acid was employed and the alcohol utilized was either hydroquinone or 1,5-dihydroxy-5-6-7-8-tetrahydronaphthalene. Also, 2.2 mole equivalents of the desired alcohol was reacted by the previously described procedure with approximately 1 mole equivalent of the acid chloride of terephthalic acid. The resulting products and their phase sequences are given in the following table.

TABLE 2

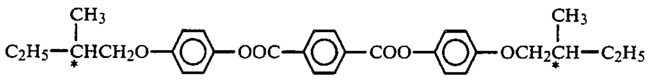

| I → | Ch → | $S_C$* → | cryst | MP |
|---|---|---|---|---|
| 149.1 | 128.9 | 113.2 | | 135 |

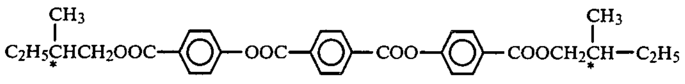

| I → | Ch → | $S_A$ → | $S_C$* → | cryst | MP |
|---|---|---|---|---|---|
| 160 | 148 | 112 | 105.5 | | 135 |

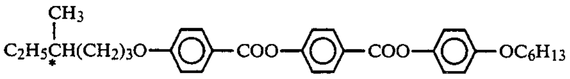

| I → | Ch → | $S_C$* → | cryst | MP |
|---|---|---|---|---|
| 175.3 | 115 | 52.3 | | 78.5 |

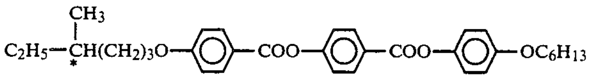

| I → | Ch → | $S_C$* → | cryst | MP |
|---|---|---|---|---|

TABLE 2-continued

| | | | | |
|---|---|---|---|---|
| 172.5 | 69.9 | 56.4 | | 88.4 |

All temperatures in degrees C.
I = Isotropic
$S_A$ = Smectic A
$S_C$ = Smectic C
MP = Melting Point
Ch = Cholesteric
cryst = Crystalline

EXAMPLE 8

To demonstrate the variety of phase sequences available by the production of liquid crystal mixtures, the following procedures were utilized. A glass slide was cleaned by immersing it in acetone and then allowing the immersed slide to dry. In sequence each liquid crystal component of the composite liquid crystal material was placed on the slide. (The percentages shown below are weight percentages for each component.) Each component of a mixture was dropped onto the slide so that it contacted the previously deposited component.

After all the components were placed on the slide, the slide was heated until the mixture was isotropic. At this temperature, the mixture was stirred and then the temperature was slowly allowed to decrease until room temperature was reached. The mixtures produced and their phase sequences are shown below.

MIXTURE 1

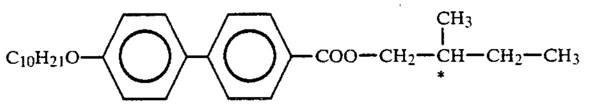
33.8%

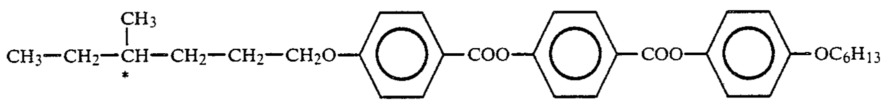
60.8%

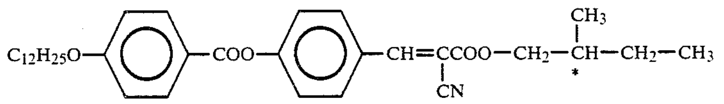
5.9% cryst $\xrightarrow{49}$ $S_C^*$ $\xrightarrow{81.1}$ Ch $\xrightarrow{120}$

MIXTURE 2

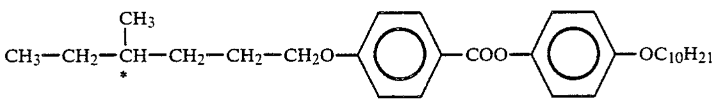
23.9%

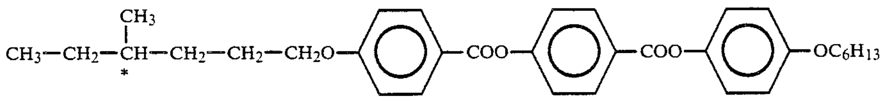
23.1%

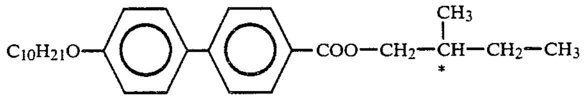
13.1%

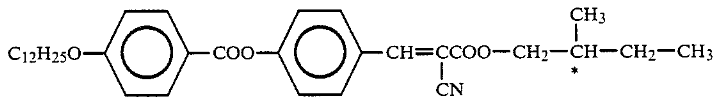
39.9% cryst $\xrightarrow{40}$ $S_C^*$ $\xrightarrow{62}$ $S_A$ $\xrightarrow{85.2}$ Ch $\xrightarrow{92.3}$ Iso MIXTURE 3
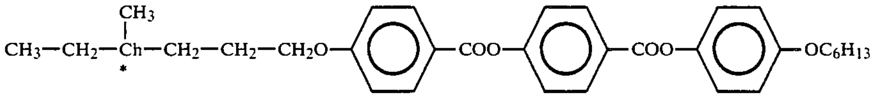
30.6%
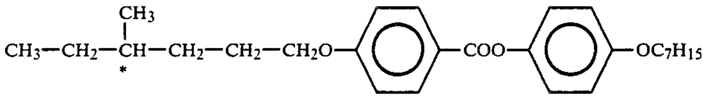
36.7%
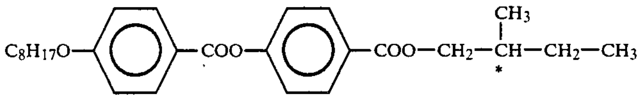
24.0%
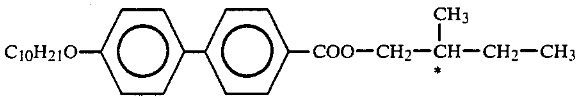
8.7%
cryst $\xrightarrow{44.7}$ $S_C^*$ $\xrightarrow{47.7}$ $S_A$ $\xrightarrow{66.6}$ Ch $\xrightarrow{88.8}$ Iso
MIXTURE 4
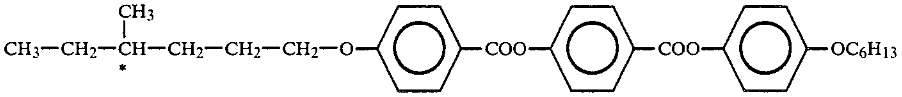
25.8%
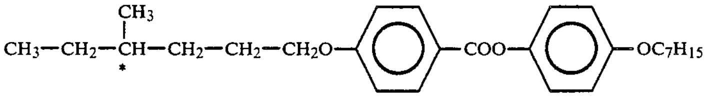
22.7%
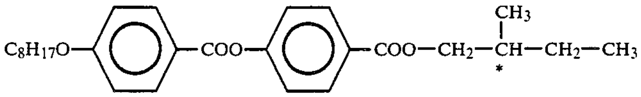
51.5%
$S_C^*$ $\xrightarrow{5}$ $S_A$ $\xrightarrow{70.3}$ Iso $\xrightarrow{82.6}$ MP below rm temp
MIXTURE 5
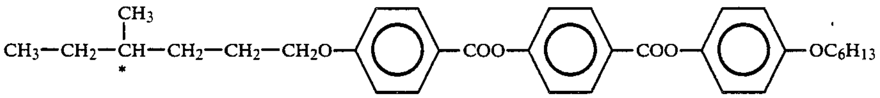
44.5%
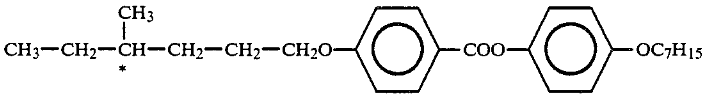
38.0%
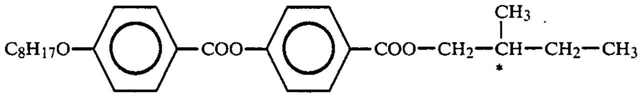
17.5%

-continued

| |
|---|
| cryst $\xrightarrow{46}$ $S_C$* $\xrightarrow{50}$ Ch $\xrightarrow{108}$ Iso |

All temperatures in degrees C
Iso = Isotropic
$S_C$ = Smectic C
Ch = Cholesteric
$S_A$ = Smectic A
MP = Melting Point
cryst = Crystalline

MIXTURE 9

| MP | | | | Wt % |
|---|---|---|---|---|
| 78 | CH | $S_C$ | 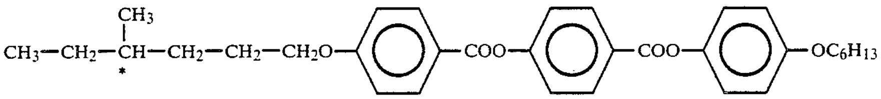 | 26.0% |
| 30 | Ch | $S_C$ | 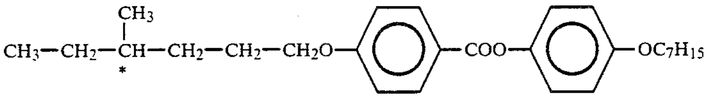 | 35.8% |
| 33 | Ch | $S_C$ | 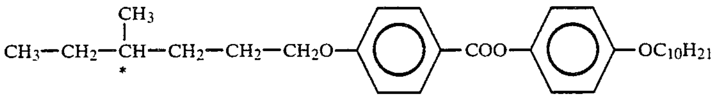 | 11.9% |
| 33 | $S_A$ | $S_C$ | 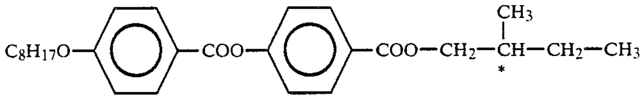 | 25.1% |
| 43 | $S_A$ | $S_C$ | 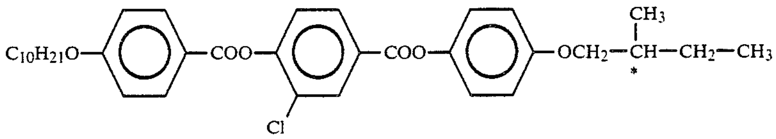 | 6.2% |
| | | | $S_C$* $\xrightarrow{48}$ $S_A$ $\xrightarrow{59}$ Ch $\xrightarrow{83}$ Iso $\longrightarrow$ MP below rm temp | |

All temperatures in degrees C
Iso = Isotropic
$S_C$ = Smectic C
Ch = Cholesterric
$S_A$ = Smectic A
MP = Melting Point
cryst = Crystalline

What is claimed is:

1. A display comprising (1) a liquid crystal material, (2) a plurality of electrodes suitable for applying a voltage to said liquid crystal material, (3) electronic means for applying a voltage to a desired electrode, and (4) means for producing an observable optical change upon application of an appropriate voltage, wherein said liquid crystal comprises a liquid crystal in the smectic C phase characterized in that said liquid crystal material comprises a compound represented by the formula

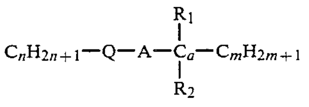

where Q is a core entity that comprises a moiety chosen from the group consisting of (I)

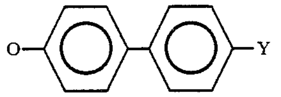

where Y is 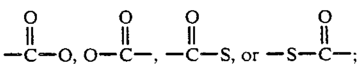;

(II)

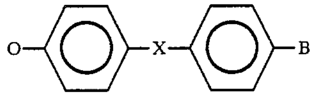

where X is 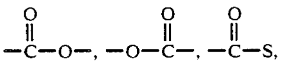,

-continued

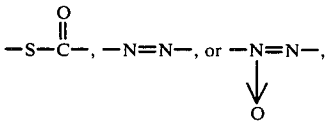

where B is 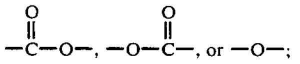

(III)

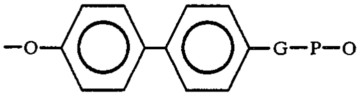

where G is 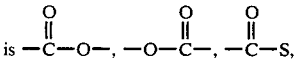

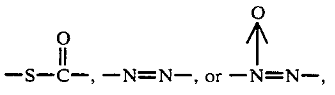

where P is 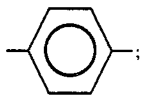

(IV)

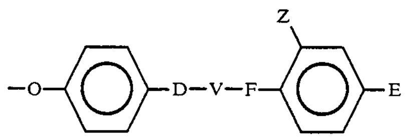

where V is 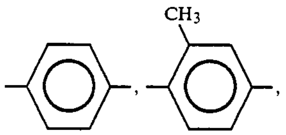

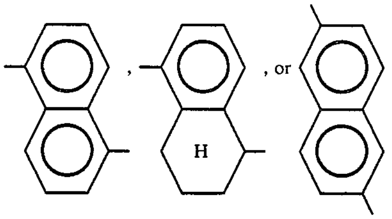

where D is 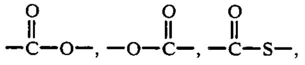

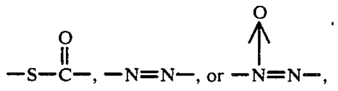

where E is 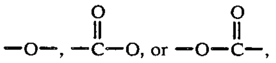

where F is 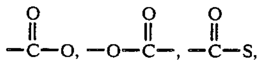

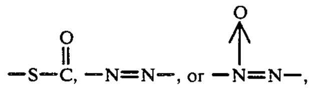

-continued where if V is 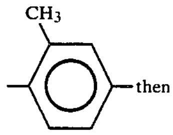 then Z is H and where if V is

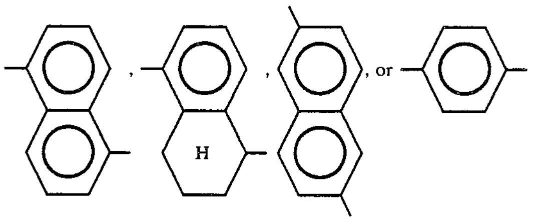

then Z is H, or $CH_3$, where A provides a separation between Q and $C_a$ which is at least 2.0 Å, and where $C_a$ is an appropriate asymmetric carbon atom whose asymmetry is produced by an appropriate choice of $R_1$ and $R_2$.

2. The display of claim 1 wherein Q is the entity represented by the formula

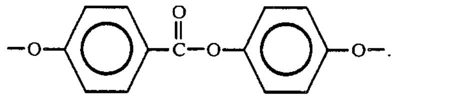

3. The display of claim 1 or 2 wherein $R_1$ and $R_2$ are lower alkyl moieties.

4. The display of claim 1 wherein said electrode comprises indium oxide.

5. The display of claim 1 or 2 wherein n is in the range 7 to 16 and m is in the range 2 to 10.

6. The display of claim 1 wherein A is a methylene group.

7. The display of claim 1 wherein said liquid crystal material comprises a compound represented by the formula

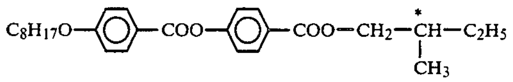

8. The display of claim 1 wherein said means for producing an observable optical change comprises crossed polarizers.

9. A display comprising a liquid crystal material in the smectic C phase contacting an electrode characterized in that said liquid crystal material comprises a compound represented by the formula

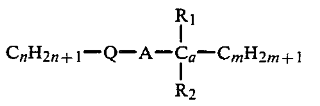

where Q is a core entity that comprises a moiety chosen from the group consisting of (I)

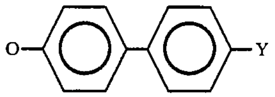

-continued where Y is 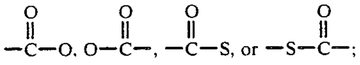

(II)

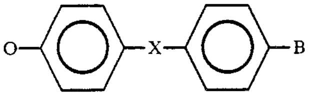

where X is 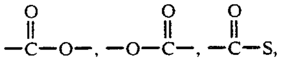

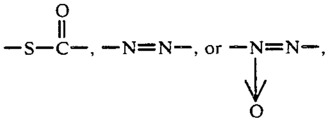

where B is 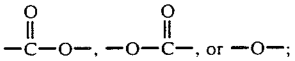

(III)

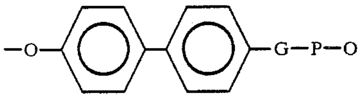

where G is 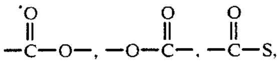

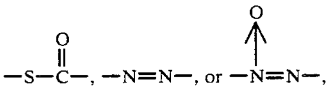

where P is either 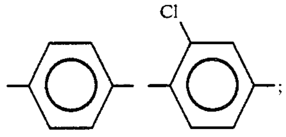

(IV)

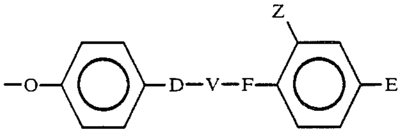

where V is 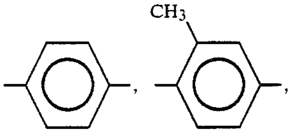

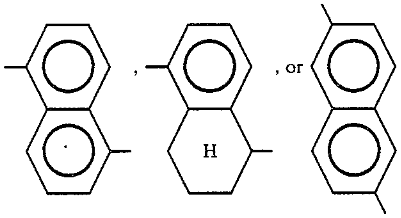

where D is 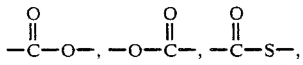

-continued

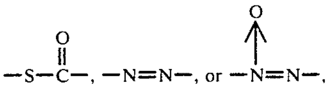

where E is 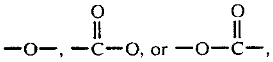

where F is 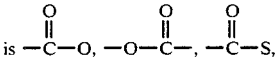

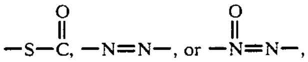

where if V is 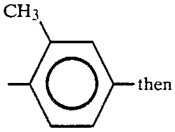 then Z is H and where if V is 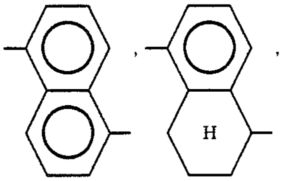

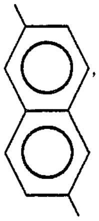 , or 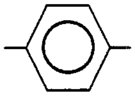

then Z is H, or $CH_3$, where A provides a separation between Q and $C_a$ which is at least 2.0 Å, and where $C_a$ is an asymmetric carbon atom whose asymmetry is produced by an appropriate choice of $R_1$ and $R_2$.

10. The display of claim 9 wherein Q is the entity represented by the formula

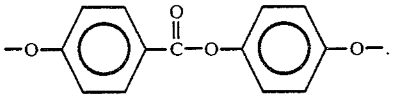

11. The display of claim 9 or 10 wherein $R_1$ and $R_2$ are lower alkyl moieties.

12. The display of claim 9 or 10 wherein n is in the range 7 to 16 and m is in the range 2 to 10.

13. The display of claim 9 wherein A is a methylene group.

14. The display of claim 9 wherein said liquid crystal material comprises a compound represented by the formula

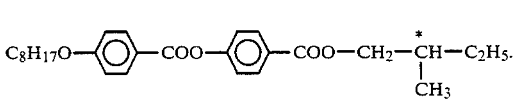

* * * * *